United States Patent [19]
Oyama

[11] Patent Number: 5,479,693
[45] Date of Patent: Jan. 2, 1996

[54] AUTOMOTIVE INSTRUMENT PANEL INSTALLANTION ARRANGEMENT AND METHOD FOR MOUNTING

[75] Inventor: Hiroshi Oyama, Chigasaki, Japan

[73] Assignee: Nissan Motor Co., Ltd., Yokohama, Japan

[21] Appl. No.: 160,755

[22] Filed: Dec. 3, 1993

[30] Foreign Application Priority Data

Dec. 21, 1992 [JP] Japan ................................ 4-340577

[51] Int. Cl.⁶ .............................. B23P 19/04; G12B 9/10
[52] U.S. Cl. ................. 29/469; 29/450; 180/90
[58] Field of Search ................. 29/469, 897.2, 29/854, 857, 243.57, 450; 180/90; 248/27.1

[56] References Cited

U.S. PATENT DOCUMENTS

| | | | |
|---|---|---|---|
| 3,270,831 | 9/1966 | Woofter et al. | 180/90 |
| 4,493,146 | 1/1985 | Cronin | 29/857 |
| 4,733,739 | 3/1988 | Lorenz et aL. | 180/90 |
| 4,750,265 | 6/1988 | Watanabe et al. | 29/854 |
| 4,895,326 | 1/1990 | Nimpoeno et al. | 248/27.1 |
| 4,929,182 | 5/1990 | Hyogo et al. | 180/90 X |

FOREIGN PATENT DOCUMENTS

| | | | |
|---|---|---|---|
| 18073 | 1/1984 | Japan | 180/90 |
| 59-108293 | 7/1984 | Japan . | |
| 171724 | 9/1984 | Japan | 180/90 |
| 190551 | 7/1989 | Japan | 180/90 |

*Primary Examiner*—Peter Vo
*Attorney, Agent, or Firm*—Lowe, Price, LeBlanc & Becker

[57] ABSTRACT

An installation arrangement for automotive instruments to be installed in an instrument panel is set up such a lower rim of an upper instrument mounting frame overlaps an upper rim of a lower instrument mounting frame when the frames are installed in an opening of the instrument panel, allowing more efficient use of space such that a plurality of instruments may be efficiently mounted without a mounting space of the instrument panel becoming excessively large.

14 Claims, 3 Drawing Sheets

AUTOMOTIVE INSTRUMENT PANEL INSTALLANTION ARRANGEMENT AND METHOD FOR MOUNTING

BACKGROUND OF THE INVENTION

1. Field of the Invention

The present invention relates generally to an installation arrangement for an instrument panel of an automotive vehicle. Specifically, the present invention relates to an installation arrangement which allows an instrument panel to be installed in an automotive vehicle easily and securely, without complex or costly components or labor.

2. Description of the Prior Art

Recently, instrument panels for automotive vehicles are becoming increasingly complex. The variety of instruments and various new types of display technology and the like combine to make automotive instrument panels costly and complex aspects of a vehicle and efficient installation thereof becomes important. Thus, it has been required to provide an arrangement for simply and efficiently installing a vehicle instrument panel.

Also, with rapidly progressing technology, the number and variety of instruments employed by drivers is increasing.

One installation arrangement for automotive instruments has been disclosed in Japanese Utility Model Application 59-108293. Referring to FIGS. 4 and 5, it can be seen that the arrangement comprises an instrument panel 1 mounting an audio deck 2 and a radio 3, for example, as an instrument cluster in a frame 5. Referring to FIG. 5, the audio deck 2 and/or radio 3 are supported on each side by a bracket 4. The bracket 4 is provided with installation tabs 4a on left and right sides thereof for receiving mounting members 5a of the frame 5 which may be fastened to the installation tabs 4a by screws or the like. The instruments (audio deck 2, radio 3, etc.) are thus mounted, as seen in FIG. 6, such that the front panels 2a, 3a, thereof are flush with a facing 5b of the frame 5.

The assembled instrument cluster, comprising the audio deck 2 and/or radio 3, the frame 5 and the bracket 4 are then inserted into an mounting opening of the instrument panel 1 and mounting tabs 4b of the bracket 4 are fastened to the instrument panel 1 by screws or the like and installation of the instrument cluster is completed.

However, since it is increasingly common to utilize other instruments, for example, satellite navigation systems, video monitors or the like, in addition to a radio 3 and/or audio deck 2, a drawback is present in the above-described conventional installation arrangement. Specifically, since the components are 'stacked' vertically and mounted so as to have the facing portions 5b of the frame 5 therebetween, a space occupied by the installed instrument cluster tends to become excessively large. Thus, it has been required to provide an arrangement for installation of an instrument cluster in an automotive instrument panel 1 in which space is efficiently used so as to allow the mounting a greater number of instruments in a relatively small space.

SUMMARY OF THE INVENTION

It is therefore a principal object of the present invention to overcome the drawbacks of the prior art.

It is a further object of the present invention to provide an installation arrangement for an automotive instrument panel in which a plurality of instruments may be simply and efficiently mounted in a relatively small space.

In order to accomplish the aforementioned and other objects, an installation arrangement for installing a plurality of components in an opening provided in an automotive instrument panel is provided, comprising: an upper instrument assembly including an upper frame a lower portion of the upper frame being provided with first engaging means, and a lower instrument assembly including a lower frame, an upper portion of the lower frame being provided with second engaging means, such that, in an installed position of the upper and lower instrument assemblies, the first and second engaging means are engaged to attach the upper and lower frames such that the lower portion of the upper assembly overlaps the upper portion of the lower assembly.

According to another aspect of the invention, a method of installing instruments in an automotive instrument panel is provided, comprising the steps of: assembling a first group of upper components including an upper frame, assembling a second group of lower components including a bracket and a lower frame, inserting the second group of components into a lower side of an installation opening provided in the instrument panel, attaching installation portions of the bracket and the lower frame to mounting portions on an inner side of the instrument panel, inserting the first group of components into an upper side of the installation opening such that a lower portion of the upper frame overlaps an upper portion of the lower frame: and securely attaching the lower portion of the upper frame to the upper portion of tile lower frame.

DESCRIPTION OF THE PREFERRED EMBODIMENT

Figure 1:
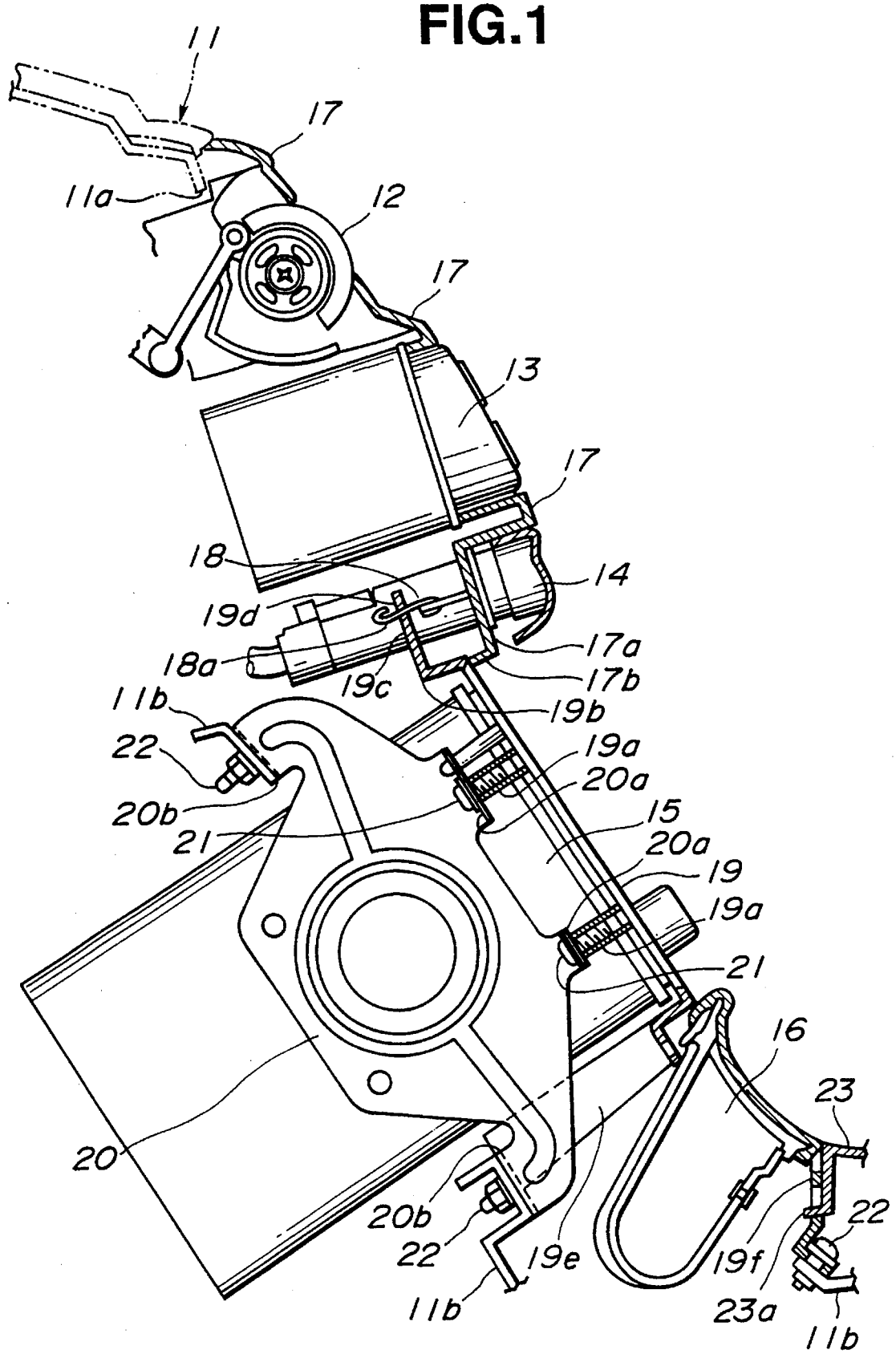
FIG. 1 is a cross-sectional view of a preferred embodiment of an installation arrangement for an automotive instrument panel, according to the invention.
Figure 2:
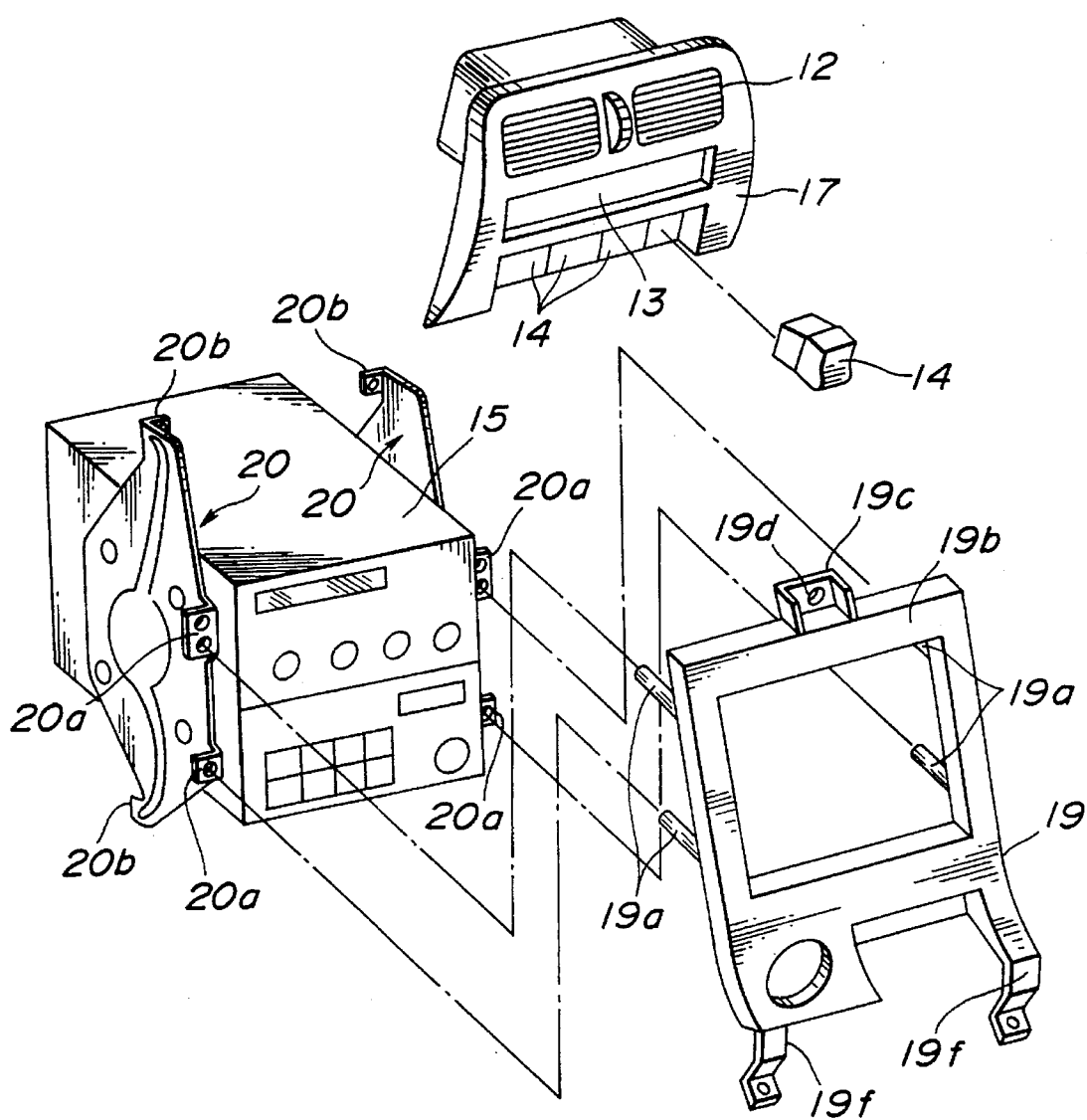
FIG. 2 is an exploded perspective view of the installation arrangement of FIG. 1.
Figure 3:
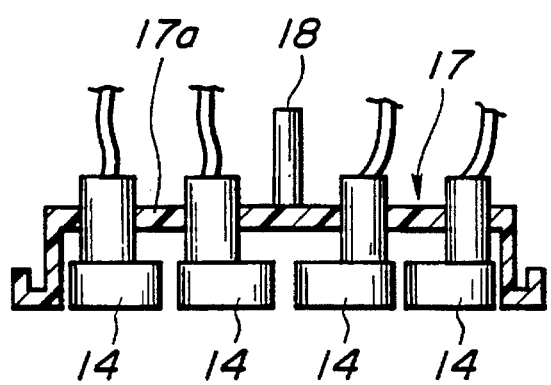
FIG. 3 is an enlarged plan view of a pushbutton arrangement utilized in the installation arrangement according to the invention.
Figure 5:
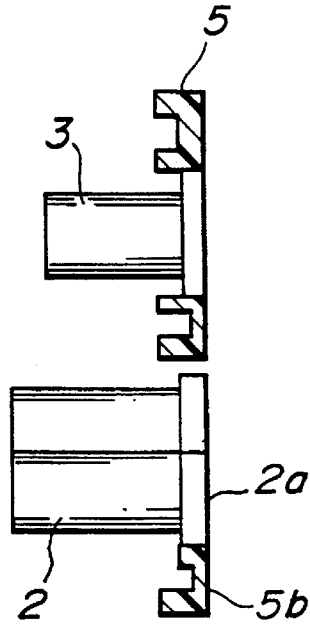
FIG. 5 is a cross-sectional view of the conventional installation arrangement of FIG. 4.
Figure 4:
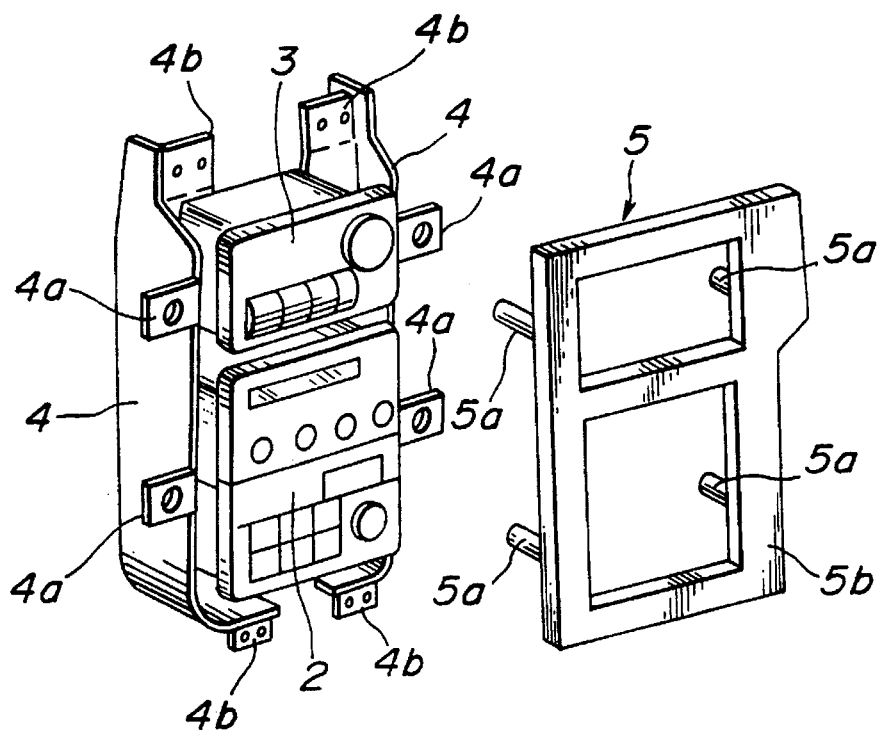
FIG. 4 is an exploded perspective view of a conventional installation arrangement.

Referring now to the drawings, particularly to FIGS. 1–3, an installation arrangement for an automotive instrument panel according to a first preferred embodiment of the invention will be described hereinbelow in detail.

Referring to FIG. 1, it may be seen that the installation arrangement according to the present embodiment includes an instrument panel 11 having a mounting opening 11a provided therethrough. In the installation opening 11a, mounted from an upper side thereof are, for example, a center vent 12, a heater controller 13, a pushbutton switch assembly 14, an audio deck 15 and an ashtray 16, although different components may also be suitably mounted by the installation arrangement of the invention.

The center vent 12, the heater controller 13 and the pushbutton switch assembly 14 comprise an upper instrument cluster the installation arrangement, being installed in a upper finisher 17. A lower edge 17a of the upper finisher 17 is attached to an inner side of a lower frame 19 via a retaining clip 18 positioned at a lower central portion of the upper frame behind the pushbutton switch assembly 14, as seen in FIG. 3.

On the other hand, the audio deck 15, and the ashtray 16 comprise a lower instrument cluster of the installation arrangement and mounted to be framed by the lower frame 19. On left and right sides of the audio deck 15, a bracket 20 is disposed. The installation tabs 20a of the bracket 20 are attached to retaining members 19a provided at the rear side of the lower frame 19, by screws 21, or the like, so as to mount the lower frame 19 on the bracket 20. Thus the lower frame 19, the brackets 20, 20 and the lower instrument cluster (audio deck 15, ashtray 16) are joined as a lower instrument assembly. As seen in FIG. 2, at an upper side 19b of the lower frame 19, a retaining clip 19c is formed for engaging the clip 18 of the upper finisher 17 via an engaging hole 19d.

Hereinbelow an installment procedure for the audio deck 15 etc., will be explained in detail.

First instrument cluster including the upper finisher 17, the center vent 12, the heater controller 13 and the pushbutton switch assembly 14 are assembled and then the lower instrument cluster including the lower frame 19, the audio deck 15 and the ashtray 16 are assembled. Then, the lower instrument cluster is inserted into the opening 11a provided in the instrument panel 11. Then mounting tabs 20b, 20b on upper and lower sides of each of the brackets 20, 20, disposed in a rear facing direction thereon, and rearwardly projected installation portions 19e, 19f of the lower frame 19 (see FIG. 1) are installed to mounting members 11b, 11b provided on the inner side of the instrument panel 11 via screws 22 so as to securely hold the upper and lower instrument clusters at an installed position relative the instrument panel 11.

Then, the upper finisher 17 and the lower frame 19 are attached via the clips 18 and 19c as mentioned above. According to the invention, the clip 18, of the lower portion 17b of the upper finisher 17, engages the engaging hole 19d of the clip 19c, of the upper portion 19b of the lower frame 19. The clips 18 and 19c are connected at a position behind the switches of the pushbutton switch assembly 14 and in a connected position thereof a positional relation is established such that the lower portions 17a, 17b of the upper finisher 17 overlap an upper portion 19b of the lower frame 19, thus reducing a necessary space required for installation. It will also be noted from FIG. 1 that a vehicle center console box 23 is shown. The installation portions 19f of the lower frame 19 are engaged by hook portions 23a provided on the console box 23 so as to secure the lower side of the installed instrument assembly.

According to the above described installation arrangement, it will be noted that the lower portion 17a of the upper finisher 17 overlaps the upper portion 19b of the lower frame 19 on a side corresponding to an interior cabin of the vehicle. Thus the upper instrument cluster comprising the center vent 12, the heater controller 13 and the pushbutton switch assembly 14 projects further into the vehicle interior than does the lower instrument cluster comprising the audio deck 15 etc.

According to the above, even if a plurality of instruments are mounted, installation and servicing of the the instruments and instrument panel 11 is easily accomplished.

Further, according to the overlap between the upper finisher 17 and the lower frame 19 and since the two are joined at a location behind the pushbutton switch assembly 14, an overall length of the combined upper and lower instruments when installed can be shortened considerably and, since the joined portion is not visible to vehicle occupants the appearance of the installation arrangement is enhanced.

Also, since the lower portion 17a of the upper finisher 17 is firmly attached to the upper portion 19b of the lower frame 19, such that bending of the lower portion 17a of the upper finisher 17 will not occur, firmness and operability of the pushbutton switch assembly 14 is improved.

It will be noted, that, although the preferred embodiment has been explained in terms of installation of instruments and accessories such as center vent 12, heater controller 13, pushbutton switch assembly 14, audio deck 15 and ashtray 16, these are examples only and a different selection of instruments and/or accessories may also be preferably installed according to the arrangement of the invention.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An installation arrangement for a plurality of vertically stacked instruments in an opening provided in an instrument panel in a vehicle, comprising:

an upper instrument assembly including an upper frame, control portions of instruments mounted in said upper frame being accessible from a front face of said upper instrument assembly and a lower portion of said upper frame being provided with first engaging means; and a lower instrument assembly including a lower frame, control portions of instruments mounted in said lower frame being accessible from a front face of said lower instrument assembly and an upper portion of said lower frame being provided with second engaging means such that, in an installed position, wherein said upper and lower instrument assemblies are respectively mounted above and below one another in a vertical relationship, said first and second engaging means are engaged to attach said upper and lower frames such that said lower portion of said upper assembly overlaps said upper portion of said lower assembly.

2. An installation arrangement as set forth in claim 1, wherein said lower portion of said upper assembly overlaps said upper portion of said lower assembly on a side facing an interior compartment of said vehicle.

3. An installation arrangement as set forth in claim 1, wherein, in an installed position of said upper and lower instrument assemblies, said upper instrument assembly projects further into a space of said interior compartment of said vehicle than said lower instrument assembly.

4. An installation arrangement as set forth in claim 1, wherein, in an installed position of said upper and lower instrument assemblies, said first and second engaging means are positioned behind a lowermost component of said upper instrument assembly.

5. An installation arrangement as set forth in claim 3, wherein said lowermost component is a pushbutton switch assembly.

6. An installation arrangement as set forth in claim 1, wherein said lower instrument assembly further includes a bracket providing additional mounting stability for said instruments mounted in said lower instrument assembly, said lower frame being attached to said bracket via engageable first installation portions respectively provided on said bracket and said lower frame and, said bracket and said lower frame further including rearwardly projecting second installation portions attachable to mounting portions provided on an inner side of said instrument panel.

7. An installation arrangement as set forth in claim 1, wherein a lower portion of said lower frame is attached to a forward end of a center console box of said vehicle.

8. An installation arrangement as set forth in claim 1, wherein in an installed condition of said upper and lower instrument assemblies said upper instrument assembly is mounted such that an angular orientation of said front face thereof is different from an angular orientation of said front face of said lower mounting assembly.

9. A method of mounting a plurality of vertically stacked instruments in an instrument panel of a vehicle, comprising the steps of:

mounting a first group of instruments via an upper frame to form an upper instrument assembly wherein control portions of said first group of instruments are accessible from a front face of said upper instrument assembly;

mounting a second group of instruments via a bracket and a lower frame to form a lower instrument assembly wherein control portions of said second group of instruments are accessible from a front face of said lower instrument assembly;

inserting said lower instrument assembly into a lower side of an installation opening provided in said instrument panel;

attaching installation portions of said bracket and said lower frame to mounting portions on an inner side of said instrument panel;

inserting said upper instrument assembly into an upper side of said installation opening such that a lower portion of said upper frame overlaps an upper portion of said lower frame; and securely attaching said lower portion of said upper frame to said upper portion of said lower frame.

10. A method as set forth in claim 9, further including a step of: attaching a lower portion of said lower frame to an end portion of a center console box of said vehicle.

11. A method as set forth in claim 9, wherein said first group of instruments is installed such that said lower portion of said upper frame overlaps said upper portion of said lower frame on a side facing an interior compartment of said vehicle.

12. A method as set forth in claim 9, wherein said attaching of said lower portion of said upper frame to said upper portion of said lower frame is performed at a location behind a lowermost instrument of said first group of instruments.

13. A method as set forth in claim 9, wherein, in an installed position of said upper and lower instrument assemblies, said upper instrument assembly projects further into a space of said interior compartment of said vehicle than said lower instrument assembly.

14. A method as set forth in claim 9, wherein, in an installed condition of said upper and lower instrument assemblies, said upper instrument assembly is mounted such that an angular orientation of said front face thereof is different from an angular orientation of said front face of said lower mounting assembly.

* * * * *